(12) United States Patent
Murphy et al.

(10) Patent No.: US 7,041,712 B2
(45) Date of Patent: May 9, 2006

(54) OPTICAL FIBER COATING COMPOSITIONS CONTAINING SECONDARY OR TERTIARY AMINO SILICONE-CONTAINING ADDITIVE

(75) Inventors: Edward J. Murphy, Arlington Heights, IL (US); Edward P. Zahora, Naperville, IL (US); Nancy L. Coster, Hobart, IN (US); Glenn Evans, Glen Ellyn, IL (US)

(73) Assignee: DSM IP Assets B.V., Heerlen (NL)

( * ) Notice: Subject to any disclaimer, the term of this patent is extended or adjusted under 35 U.S.C. 154(b) by 103 days.

(21) Appl. No.: 10/327,798

(22) Filed: Dec. 23, 2002

(65) Prior Publication Data

US 2003/0176523 A1 Sep. 18, 2003

Related U.S. Application Data

(62) Division of application No. 09/471,694, filed on Dec. 23, 1999, now Pat. No. 6,538,045.

(51) Int. Cl.
*C09D 183/04* (2006.01)
*C09D 11/00* (2006.01)
*C08G 77/26* (2006.01)

(52) U.S. Cl. .................. 522/148; 522/100; 522/91; 522/172; 528/26

(58) Field of Classification Search ............... 522/170, 522/148, 99, 172; 428/378
See application file for complete search history.

(56) References Cited

U.S. PATENT DOCUMENTS

| | | | |
|---|---|---|---|
| 3,881,976 A | 5/1975 | Jones | |
| 3,920,432 A | 11/1975 | Smith | |
| 3,984,172 A | 10/1976 | Miller | |
| 4,046,298 A | 9/1977 | Schroeder, Jr. | |
| 4,096,010 A | 6/1978 | Parham et al. | |
| 4,147,407 A | 4/1979 | Eichenbaum et al. | |
| 4,346,145 A | 8/1982 | Choi et al. | |
| 4,355,865 A | 10/1982 | Conrad et al. | |
| 4,364,788 A | 12/1982 | Bloodworth et al. | |
| 4,563,539 A * | 1/1986 | Gornowicz et al. | 556/421 |
| 4,592,955 A | 6/1986 | Choi et al. | |
| 4,697,026 A * | 9/1987 | Lee et al. | 556/418 |
| 4,755,577 A | 7/1988 | Suzuki | |
| 4,828,349 A | 5/1989 | Nakasuji | |
| 4,844,064 A | 7/1989 | Thimsen et al. | |
| 4,906,067 A | 3/1990 | Mayr et al. | |
| 5,169,879 A | 12/1992 | Lee et al. | |
| 5,260,350 A | 11/1993 | Wright | |
| 5,489,622 A | 2/1996 | Hara et al. | |
| 5,502,145 A | 3/1996 | Szum | |
| 5,595,820 A | 1/1997 | Szum | |
| 5,739,192 A * | 4/1998 | Blizzard et al. | 524/379 |
| 6,023,547 A | 2/2000 | Tortorello | |
| 6,110,593 A | 8/2000 | Szum et al. | |

FOREIGN PATENT DOCUMENTS

| | | |
|---|---|---|
| EP | 0 101 766 | 3/1984 |
| EP | 0 130 728 A2 | 1/1985 |
| EP | 0 151 047 A2 | 8/1985 |
| GB | 2 096 343 | 10/1982 |
| JP | 58-98707 | 6/1983 |
| JP | 60-153014 | 8/1985 |
| JP | 60-154204 | 8/1985 |
| JP | 62-054206 | 3/1987 |
| JP | 63-070210 | 3/1988 |
| JP | HI-152405 | 6/1989 |
| WO | WO 90/13579 | 11/1990 |
| WO | WO 91/17198 | 11/1991 |

OTHER PUBLICATIONS

Excerpts from the book entitled "UV Curing in Screen Printing for Printed Circuits and the Graphic Arts" by Steven G. Wentink et al., pp. 3, 49 and 83.

* cited by examiner

*Primary Examiner*—Susan Berman
(74) *Attorney, Agent, or Firm*—Leydig, Voit & Mayer, Ltd.

(57) ABSTRACT

A radiation-curable composition for an ink base, ink composition, outer primary composition, buffering material or matrix material for fiber optics includes, in the uncured state, a secondary amino or tertiary amino silicone-containing additive.

7 Claims, No Drawings

OPTICAL FIBER COATING COMPOSITIONS CONTAINING SECONDARY OR TERTIARY AMINO SILICONE-CONTAINING ADDITIVE

CROSS REFERENCE TO RELATED PATENT APPLICATION

This patent application is a division of U.S. patent application Ser. No. 09/471,694, filed Dec. 23, 1999, now U.S. Pat. No. 6,538,045.

BACKGROUND OF THE INVENTION

1. Field of the Invention

The present invention relates generally to optical fiber coating compositions, and, more particularly, to fiber optic coating compositions that include a secondary or tertiary amino silicone-containing release agent, and to optical fibers coated with such compositions.

2. Description of Related Art

Optical glass fibers are frequently coated with two or more superposed radiation-curable coatings which together form a primary coating immediately after the glass fiber is produced by drawing in a furnace. The coating which directly contacts the optical glass fiber is called the "inner primary coating" and an overlaying coating is called the "outer primary coating." In older references, the inner primary coating was often called simply the "primary coating" and the outer primary coating was called a "secondary coating," but for reasons of clarity, that terminology has been abandoned by the industry in recent years. Inner primary coatings are softer than outer primary coatings.

Single-layered coatings ("single coatings") can also be used to coat optical fibers. Single coatings generally have properties (e.g., hardness) which are intermediate to the properties of the softer inner primary and harder outer primary coatings.

The relatively soft inner primary coating provides resistance to microbending which results in attenuation of the signal transmission capability of the coated optical fiber and is, therefore, undesirable. The harder outer primary coating provides resistance to handling forces such as those encountered when the coated fiber is ribboned and/or cabled.

Optical fiber coating compositions, whether they are inner primary coatings, outer primary coatings, or single coatings, generally comprise, before cure, a polyethylenically-unsaturated monomer or oligomer dissolved or dispersed in a liquid ethylenically-unsaturated medium and a photoinitiator. The coating composition is typically applied to the optical fiber in liquid form and then exposed to actinic radiation to effect cure.

For the purpose of multi-channel transmission, optical fiber assemblies containing a plurality of coated optical fibers have been used. Examples of optical fiber assemblies include ribbon assemblies and cables. A typical ribbon assembly is made by bonding together a plurality of parallel oriented, individually coated optical fibers with a matrix material. The matrix material has the function of holding the individual optical fibers in alignment and protecting the fibers during handling and installation. Often, the fibers are arranged in "tape-like" ribbon structures, having a generally flat, strand-like structure containing generally from about 2 to 24 fibers. Depending upon the application, a plurality of ribbon assemblies can be combined into a cable which has from several up to about one thousand individually coated optical fibers. An example of a ribbon assembly is described in published European patent application No. 194891. A plurality of ribbon assemblies may be combined together in a cable, as disclosed, for example, in U.S. Pat. No. 4,906,067.

The term "ribbon assembly" includes not only the tape-like ribbon assembly described above, but optical fiber bundles as well. Optical fiber bundles can be, for example, a substantially circular array having at least one central fiber surrounded by a plurality of other optical fibers. Alternatively, the bundle may have other cross-sectional shapes such as square, trapezoid, and the like.

Coated optical fibers (or waveguides) whether glass, or, as has come into use more recently, plastic, for use in optical fiber assemblies are usually colored to facilitate identification of the individual coated optical fibers. Typically, optical fibers are coated with an outer colored layer, called an ink coating, or alternatively a colorant is added to the outer primary coating to impart the desired color.

Typically, the matrix material of a fiber optic ribbon assembly or cable is separated from the individual coated fibers in order to facilitate splicing two cables, or the connection of a fiber to an input or output. It is highly desirable that the matrix material can be removed from the coated fiber with little or no effect on the outer primary coating or colored ink coating of the fiber. Good removability of the matrix material not only preserves the readily visual identification of the color coded fiber, it also avoids harming the waveguide during the removal process.

Heretofore, certain types of silicone-containing compounds have been suggested for inclusion in the coloring layer and/or matrix materials to enhance the removability of the matrix material of the ribbon from color coated optical fiber. For example, U.S. Pat. No. 4,828,349 describes a multi-core optical fiber unit in which each optical fiber element is coated with a peel layer and bound into a ribbon or cable with a covering layer. The peel layer of each optical fiber is comprised of an ultraviolate curing or thermosetting fluorocarbon resin or an ultraviolet curing or thermosetting silicone resin.

U.S. Pat. No. 5,621,838 discloses a multi-fiber coated optical fiber unit in which each of the coated optical fibers has a coloring layer as the outermost layer and is coated with a bundling or matrix layer. The coloring layers on the coated fibers and the matrix layer both contain a releasing agent consisting of a silicon resin or oil or a fluororesin or fluoro-oil as known in the art at the time the application for the patent was filed.

Japan laid-opened patent H1-152405 discloses an optical fiber taped core wire in which a plurality of optical core wires arranged in a plane are coated into a single unit. Each of the optical fiber core wires is coated with an ultraviolet cured resin and has a colored layer as its outermost layer. The colored layer includes an organic polysiloxane compound to improve the removability of the matrix coating. The organic polysiloxane compound includes at least one functional group, including an amino group.

Ink compositions which include silicone-based release agents have been used in the art, but are not entirely satisfactory. Silicone release agents, particularly those that are not reactive under the UV cure conditions, have been found to migrate in the ribbon assembly over time. Migration alters the release characteristics of the matrix materials from the outermost coating on the fiber optic, i.e., the outer primary coating or the ink coating, which is undesirable. Silicone release agents are also known to impair the stability of the pigment dispersion in the ink composition leading to pigment flocculation, particularly when the silicone release agent is added to the finished ink composition. Silicone release agents can also reduce the efficiency of manufacturing optical fiber ribbon by slowing line speed and reducing cure rate of the ink composition.

Despite the efforts of the prior art to provide optical fiber coating compositions and ink compositions in which, when a plurality of optical fibers are formed into a ribbon assembly, the matrix material of the ribbon assembly is easily removed from the ink composition, there remains a need for new release agents for ink compositions which allow for improved release of the matrix material, improve the stability of the pigment dispersion in the ink composition even when the release agent is added to the finished ink composition, and allow for improved efficiency and speed of manufacture of optical fiber ribbon.

SUMMARY OF THE INVENTION

The present invention is predicated on the discovery that secondary and tertiary amino silicone-containing compounds can be added to radiation curable compositions typically used as coatings in the optical fiber field, including, ink base compositions, inks, outer primary coatings, single coatings, buffering material and matrix material, to effect the release of adjacent coatings from one another when needed, such as, for example, in field applications. The secondary and tertiary amino silicone-containing compounds are compatible with ink bases and with finished ink compositions, and they show excellent pigment dispersion stability in both ink bases and ink compositions, even when the silicone-containing additive is post added to finished inks. Secondary and tertiary amino additives are desirably not fugitive, and they do not tend to migrate significantly in ribbon structures, thereby avoiding changes in release characteristics over time.

DETAILED DESCRIPTION OF THE PREFERRED EMBODIMENTS

In accordance with the present invention, fiber optic coating compositions which include a secondary amino or tertiary amino silicone-containing release agent are provided. It will also be appreciated by those skilled in the art that both a secondary and a tertiary amino silicone-containing release agent can be included in fiber optic coating compositions, as desired. Use of the silicone-containing release agents in accordance with the invention facilitates removability or separability of two adjacent layers on a coated optical fiber.

The release agents in accordance with the present invention can be used in an ink base composition, i.e., an uncolored composition, later colored for example with a pigment, dye or the like. Similarly, the release agents of the present invention can be used in an ink composition, that is, a composition which includes the desired coloring agent. Inclusion of the secondary or tertiary amino silicone-containing release agent in the colored coating on the optical fiber in accordance with the invention assists in the removability or separability of the ribbon matrix materials from the colored coating. Thus, when optical fibers coated with an ink composition of the present invention are ribbonized, and removal of the ribbon material from the fibers is desired to facilitate connectorizing operations, for example, the unwanted matrix material can be stripped from the colored coating while, at the same time, the color coating on each fiber optic is retained. It will be appreciated that the release agents described herein can be used in the outer primary coating, in buffering materials typically used as a coating on single optical fibers, in single coatings and in matrix materials.

Any of a wide variety of secondary and tertiary amino silicone-containing release additives can be used in the coating compositions of the present invention. Secondary and tertiary amino derivatives of di-substituted disiloxanes and polydi-substituted siloxanes are the desired silicone-containing additives in accordance with the invention. Such silicone-containing release additives that have been found useful are compounds that include the structure:

(I)

wherein each of $R^1$, $R^2$, $R^3$ and $R^4$ can be the same or different and each is an aliphatic or an aromatic hydrocarbon. Illustrative of the aliphatic hydrocarbons that can be any of $R^1$ through $R^4$ are alkyl groups of from 1 to about 20 carbon atoms, preferably from 1 to about 8 carbon atoms and most preferably from 1 to about 4 carbon atoms. Examples of alkyl groups include methyl, ethyl, propyl or the like. Illustrative of the aromatic groups that can be any of $R^1$ through $R^4$ are phenyl and phenyl derivatives. An example of a compound having the structure (I) above wherein $R^1$, $R^2$, $R^3$ and $R^4$ are alkyl and aromatic is diphenyl dimethylsiloxane, e.g., Mirasil DPDM available from Rhone-Poulenc.

Dimethyl disiloxane silicone-containing additives are preferred. An example of a dimethyl disiloxane silicone-containing additive that is useful in the fiber optic compositions of the present invention are secondary and tertiary amino derivatives of epoxycyclohexylethyl dimethyl disiloxanes.

Illustrative of secondary and tertiary amino polydi-substituted siloxanes that are useful in the fiber optic compositions of the present invention are α,ω-aminoorganofunctional polydi-substituted siloxanes of the Formula II:

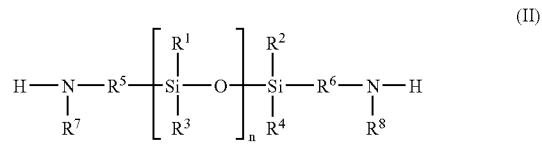

(II)

wherein $R^1$, $R^2$, $R^3$ and $R^4$ are as defined above, and n is an integer of from about 5 to about 50, and preferably of from about 10 to about 35.

The substituents $R^5$ and $R^6$ are not narrowly critical to the invention. Each of $R^5$ and $R^6$ can be the same or different. $R^5$ and $R^6$ typically form a part of the silicone-containing additive to increase the molecular weight of the compound to a molecular weight sufficiently high to achieve the desired release properties, and to render the silicone-containing compound soluble in the UV-curable composition. Preferably, each of $R^5$ and $R^6$ is an alkoxy or ring opened epoxy, such as ethoxy, propoxy, butoxy and repeat units thereof. Such materials are preferred as they enhance the compatibility of the silicone-containing compound with the components typically utilized in UV-curable compositions.

The substituents $R^7$ and $R^8$ are also not critical to the invention, and can be the same or different. Generally, $R^7$ and $R^8$ can each independently be an aliphatic or an aromatic hydrocarbon. Preferably, each of $R^7$ and $R^8$ is a sterically hindered group, such as a branched alkyl group having at least 3 carbon atoms or an alicyclic or heterocyclic hydrocarbon. The alkyl, alicyclic and aromatic hydrocarbons can also be substituted, such as, for example, with alkyl, alkenyl, hydroxyl, carboxyl, or carbonyl groups or the like. Examples of branched alkyl groups include isopropyl, t-butyl, isopentyl or the like. Examples of alicyclic hydrocarbons and aromatic hydrocarbons, include, by way of illustration, cyclopentyl, cyclohexyl, phenyl, toluyl, or the like. Examples of heterocyclic hydrocarbons include furan, thiophene, oxazole, thiazole, pyridine, pyrimidine, quinoline, or the like. The hindered group can also be long chain fatty acids of, for example, twelve or more carbon atoms.

The preferred α,ω-aminoorganofunctional polydi-substituted siloxanes are α,ω-aminoorganofunctional polydimethyl siloxanes having the Formula II described above. The functional groups on such compounds are secondary amino groups and the compounds have a functionality of two. One such compound (Additive A) is further characterized as having about 10 repeating units, i.e., n≅10, a nitrogen content of about 3%, an active hydrogen-equivalent weight of amine of about 460, a viscosity at 25° C. of about 10 mPas, and a specific gravity at 25° C. of about 0.93 g/cm$^3$. Another such compound (Additive B) is further characterized as having about 30 repeating units, i.e., n≅30, a nitrogen content of about 1.2, an active hydrogen-equivalent weight of amine of about 1,160, a viscosity at 25° C. of about 35 mPas and a specific gravity at 25° C. of about 0.96 g/cm$^3$.

The use of secondary amino silicone-containing release agents is preferred. Secondary amino silicone-containing release agents are not prone to be fugitive and tend not to migrate in the composition over time, yet they still provide very desirable release characteristics.

The amount of secondary or tertiary amino silicone-containing agent included in the composition is not narrowly critical. The silicone-containing additive need be added only in an amount sufficient to achieve the desired release, peel and separability characteristics, and the exact amount added to any particular fiber optic composition can be determined readily by one skilled in the art. For example, the silicone-containing additive can be included in an amount of from about 0.1 to about 10 wt. % of the composition, preferably from about 0.5 wt. % to about 5 wt. % of the composition, and most preferably from about 1 wt. % to about 4 wt. % of the composition.

Ink compositions in accordance with the present invention tend to minimize or even avoid fugitivity of the silicone-containing additive, unlike ink compositions with non-reactive silicone-containing additives, and they tend to minimize or avoid migration of the silicone-containing additive in the ribbon assemblies made with ink coated optical fiber. The ink compositions of the present invention can be applied to optical fiber at faster line speeds than compositions with silicone-containing additives previously known. Accordingly, throughput rate is enhanced.

Advantageously, the ink compositions of the present invention exhibit excellent release from matrix materials in ribbon assemblies, while maintaining good adhesion to the outer primary coating. They also exhibit excellent MEK resistance and breakout. Thus, ribbon assemblies made with fiber colored with the ink composition of the present invention are especially well-suited to field applications where the matrix material is removed for connectorizing operations, leaving the colored fiber exposed to facilitate ready identification of the colored fiber for connection.

The coating composition of the present invention is applicable to all radiation-curable, optical fiber coating compositions, whether used to coat glass or plastic waveguides.

Examples of suitable radiation-curable compositions which may be used variously include those which are disclosed, for example, in U.S. Pat. Nos. 4,624,994, 4,682,851, 4,782,129, 4,794,133, 4,806,574, 4,849,462, 5,219,896 and 5,336,563, all of which are incorporated herein by reference. These compositions can be reformulated and utilized as the radiation-curable carrier system in the ink base and ink composition according to the present invention.

Inner primary, outer primary, ink base and ink radiation-curable compositions contain one or more radiation-curable oligomers or monomers having at least one functional group capable of polymerization when exposed to actinic radiation. Suitable radiation-curable oligomers or monomers are now well known and within the skill of the art.

Commonly, the radiation-curable functionality used is ethylenic unsaturation, which can be polymerized through radical polymerization or cationic polymerization. Specific examples of suitable ethylenic unsaturation are groups containing acrylate, methacrylate, styrene, vinylether, vinyl ester, N-substituted acrylamide, N-vinyl amide, maleate esters, and fumarate esters. Preferably, the ethylenic unsaturation is provided by a group containing acrylate, methacrylate, N-vinyl or styrene functionality.

In one embodiment of the invention, the present invention provides a radiation curable fiber optic ink base composition comprising, in the uncured state, at least one monomer or oligomer having a radiation-curable functional group, a photoinitiator for the monomer or oligomer and a silicone-containing additive comprising the reaction product of a secondary amino-functional poly(di-substituted siloxane) and an ethylenically unsaturated compound.

The photoinitiator described in the fiber optic ink base composition is present in an amount sufficient to effect radiation cure of the monomer or oligomer. The siloxane is substituted with at least one aliphatic hydrocardon, at least one aromatic hydrocarbon or combinations of aliphatic and aromatic hydrocarbons. It is contemplated that the ethylenically unsaturated compound includes only one double bond allowing the reaction product of the secondary amino-functional poly(di-substituted siloxane) and the ethylenically unsaturated compound to be substantially free of ethylenic unsaturation. These ethylenically unsaturated compounds are, for example, an acrylate or methacrylate.

Another type of functionality generally used is provided by, for example, epoxy groups, or thiol-ene or amine-ene systems. Epoxy groups can be polymerized through cationic polymerization, whereas the thiol-ene and amine-ene systems are usually polymerized through radical polymerization. The epoxy groups can be, for example, homopolymerized. In the thiol-ene and amine-ene systems, for example, polymerization can occur between a group containing allylic unsaturation and a group containing a tertiary amine or thiol.

For the ink base and ink compositions, preferably at least about 80 mole %, and more preferably, at least about 90 mole % of the radiation-curable functional groups present in the oligomer are acrylate, methacrylate and N-vinyl.

A mixture of mono-, di-, tri-, tetra-, and higher functionalized oligomers can be used to achieve the desired balance of properties, wherein the functionalization refers to the number of radiation-curable functional groups present in the oligomer.

The oligomers usually comprise a carbon-containing backbone structure to which the radiation-curable functional group(s) are bound. For example, the oligomer can be represented by the formula:

R—X—R; or

R-L-X-L-R where
R is a radiation-curable functional group,
X is a carbon-containing polymeric backbone, an aromatic group containing moiety, or a combination thereof, and
L is a linking group.

The size of the carbon-containing backbone is preferably selected to provide the desired molecular weight and the selection of the backbone can take into account the limiting group L, if a linking group is included in the oligomer. The number average molecular weight of the oligomer is desirably of from about 200 to about 30,000, preferably of from about 500 to about 7,000, and most preferably of from about 1,000 to about 5,000.

Illustrative of suitable carbon-containing polymeric backbones include a polymeric backbone of a polyether, a polyolefin, a polyester, a polyamide, a polycarbonate, an alkyd or mixtures thereof.

Further, by way of example, the carbon-containing backbone of the oligomer can comprise aromatic groups and ring-opened epoxy groups or alkoxy groups.

The aromatic groups can be derived, for example, from bisphenol units, such as bisphenol A. Suitable oligomers are well known to those skilled in the art. A preferred oligomer is a diglycidyl ether derivative of bisphenol A to which acrylate functional groups have been bound. A commercially available example of such an oligomer is CN-120 (Sartomer), which has a molecular weight of about 500, and when cured has a $T_g$ of about 65° C.

Examples of suitable linking groups include alkoxy or ring opened epoxy such as ethoxy, propoxy, butoxy, and repeat units thereof. L can also be a urethane or urea linking group.

Another example of a preferred oligomer is a trifunctional polyether or polyester having a molecular weight of about 500 to about 5000. A preferred example of a trifunctional oligomer is the commercially available polyurethane triacrylate, "Oligomer B," which has a molecular weight of about 2000, and when cured a $T_g$ of about 42° C.

The tertiary amino silicone-containing release agent can be an oligomer, which, in a preferred embodiment, makes use of intermediate linking groups. This oligomeric release agent is represented by the following generic structure:

R-L$_1$-A-L$_2$-R wherein A represents a silicone-containing moiety,
R represents an amino-containing group which may, but need not contain, a radiation-curable moiety, and
L$_1$ and L$_2$ represent linking groups.

L$_1$ and L$_2$ can be independently any group capable of providing a covalent link between the "R" moiety and the "A" moiety. Based on the disclosure provided herein, one skilled in the art will easily be able to understand what linking groups are suitable for the particular "A" and "R" groups selected.

In particular, urethane groups are preferred. Urethane linking groups are formed by, for example, (i) linking a hydroxyl end-capped oligomer with a low molecular weight diisocyanate compound at both oligomer ends without extensive coupling of the oligomer, (ii) linking the isocyanate end-capped oligomer with a low molecular weight amine.

In a preferred embodiment of the present invention the secondary or tertiary amino silicone-containing release agent is prepared as a composite oligomer with use of the following ingredients: silicone-containing compound having two hydroxyl end groups (A), isophorone diisocyanate (L$_1$, L$_2$), and hydroxyl-containing radiation-curable moiety which is then capped with an amine. Isophorone diisocyanate (IPDI) serves to end-cap both ends of the silicone diol oligomer and provide a linking site with the radiation-curable moiety capped with the amine.

Examples of diisocyanates that can be used in the practice of the present invention in the preparation of the tertiary amino silicone-containing release agent include:
toluene diisocyanate (TDI);
diphenylmethane diisocyanate (MDI);
phenylene diisocyanate (PDI);
naphthalene diisocyanate (NDI);
tetramethylxylene diisocyanate (TMXDI);
meta-xylene diisocyanate (MXDI);
bis 4,4'-(isocyanatocyclohexyl)methane (DES W)(HMDI);
isophorone diisocyanate (IPDI);
hexamethylenediisocyanate (HDI);
trimethylhexamethylene diisocyanate (TMDI);
trans-cyclohexane diisocyanate (Elate 166);
1,3-bis(isocyanatomethyl)cyclohexane (1,3 BIC);
dimer acid diisocyanate (DDI-1410);
norbomene diisocyanate (NBDI);
dimethyl meta-isopropenyl benzyl isocyanate (meta-TMI);
trifunctional biuret adduct of HDI;
isocyanurate trimer of HDI; and
isocyanurate trimer of IPDI and the like.

By way of illustration, and not in limitation of the present invention, a silicone urethane can be prepared by reacting a silicone-containing compound with an isocyanate group to form a urethane-containing silicone precursor. The precursor can then be reacted with a secondary or tertiary amino-containing compound to form the secondary or tertiary amino silicone-containing urethane. For example, an hydroxy functional alkoxy-polydimethylsiloxane can be reacted with a diisocyanate to form a silicone-containing urethane precursor containing an isocyanato group. The silicone-containing urethane precursor can then be reacted with a compound which includes a tertiary amine to form an amino silicone-containing compound. Preferably, the amino silicone-containing compound is thus reactive with the isocyanato group of the precursor. This reaction may take place through any reactive substituent in the compound.

Preferably, the secondary a tertiary amino compound has a reactive moiety such as a hydroxy moiety that can react with the urethane precursor to form the silicone urethane. Examples of secondary and tertiary amine compounds that can be used in the practice of the invention include dialkyl alcohol amines such as dimethylethanol amine, dimethyl propanol amine, diethanol amine or the like, cyclic amines, including hydroxyethyl morpholine, 1-ethyl-3-hydroxy piperidine, or the like.

Inner primary, outer primary, ink base and ink radiation-curable compositions may also contain a reactive diluent which is used to adjust the viscosity. The reactive diluent can be a low viscosity monomer having at least one functional group capable of polymerization when exposed to actinic radiation. Usually, the viscosity of the low viscosity diluent monomer is from about 50 to about 500 centipoise at 25° C. Examples of suitable viscosities for optical glass fiber coating compositions range from about 500 to about 50,000 centipoise at 25° C. Preferred amounts of radiation-curable diluent monomer include from about 5 to about 70% by weight, more preferably, from about 10 to about 60% by weight, based on the total weight of the composition.

The functional group in the reactive diluent may be of the same nature as that used in the radiation-curable monomer or oligomer. Preferably, the functional group present in the reactive diluent is capable of copolymerizing with the radiation-curable functional group present on the radiation-curable monomer or oligomer. More preferably, the radiation-curable functional group forms free radicals during curing which can react with the free radicals generated on the surface of the surface treated optical fiber.

For example, the reactive diluent can be a monomer or mixture of monomers having an acrylate or vinyl ether functionality and a $C_4$–$C_{20}$ alkyl or polyether moiety. Particular examples of such reactive diluents include:
hexylacrylate,
2-ethylhexylacrylate,
isobornylacrylate,
decyl-acrylate,
laurylacrylate,
stearylacrylate,
2-ethoxyethoxy-ethylacrylate,
laurylvinylether,
2-ethylhexylvinyl ether,
N-vinyl formamide,
isodecyl acrylate,
isooctyl acrylate,
vinyl-caprolactam,
N-vinylpyrrolidone, and the like.

Another type of reactive diluent that can be used is a compound having an aromatic group. Particular examples of reactive diluents having an aromatic group include:
ethyleneglycolphenylether acrylate, polyethyleneglycolphenylether acrylate,
polypropyleneglycolphenylether acrylate, and
alkyl-substituted phenyl derivatives of the above monomers, such as polyethyleneglycolnonylphenylether acrylate.

The reactive diluent can also comprise a diluent having two or more functional groups capable of polymerization. Particular examples of such monomers include:
$C_2$–$C_{18}$ hydrocarbondioldiacrylates,
$C_4$–$C_{18}$ hydrocarbondivinylethers,
$C_3$–$C_{18}$ hydrocarbon triacrylates, and the polyether analogues thereof, and the like, such as
1,6-hexanedioldiacrylate,
trimethylolpropanetriacrylate,
hexanedioldivinylether,
triethyleneglycoldiacrylate,
pentaerythritoltriacrylate,
ethoxylated bisphenol-A diacrylate, and
tripropyleneglycol diacrylate.

If the radiation-curable functional group of the radiation-curable monomer or oligomer is an epoxy group, for example, one or more of the following compounds can be used as the reactive diluent:
epoxy-cyclohexane,
phenylepoxyethane,
1,2-epoxy-4-vinylcyclohexane,
glycidylacrylate,
1,2-epoxy-4-epoxyethyl-cyclohexane, diglycidylether of polyethylene-glycol,
diglycidylether of bisphenol-A, and the like.

If the radiation-curable functional group of the radiation-curable monomer or oligomer has an amine-ene or thiol-ene system, examples of reactive diluents having allylic unsaturation that can be used include:
diallylphthalate,
triallyltri-mellitate,
triallylcyanurate,
triallylisocyanurate, and
diallylisophthalate.

For amine-ene systems, amine functional diluents that can be used include, for example:
the adduct of trimethylolpropane,
isophoronediisocyanate and
di(m)ethylethanolamine,
the adduct of hexanediol, isophoronediisocyanate
and dipropylethanolamine, and
the adduct of trimethylol propane, trimethylhexamethylenediisocyanate
and di(m)ethylethanolamine.

The radiation-curable ink composition can contain free-radical generating photoinitiators. Examples of suitable free radical-type photoinitiators include, but are not limited to, the following:
isobutyl benzoin ether;
2,4,6-trimethylbenzoyl, diphenylphosphine-oxide;
1-hydroxycyclohexylphenyl ketone;
2-benzyl-2-dimethylamino-1-(4-morpholinophenyl)-butan-1-one;
2,2-dimethoxy-2-phenylacetophenone; perfluorinated diphenyl titanocene;
2-methyl-1-[4-(methylthio)phenyl]-2-(4-morpholinyl)-1-propanone;
2-hydroxy-2-methyl-1-phenyl propan-1-one;
4-(2-hydroxyethoxy)phenyl-2-hydroxy-2-propyl ketone dimethoxyphenylacetophenone;
1-(4-isopropylphenyl)-2-hydroxy-2-methylpropan-1-one;
1-(4-dodecyl-phenyl)-2-hydroxy-2-methylpropan-1-one;
4-(2-hydroxyethoxy)phenyl-2(2-hydroxy-2-propyl)-ketone;
diethoxyphenyl acetophenone;
a mixture of (2,6-dimethoxy benzoyl)-2,4,4 trimethylpentylphosphineoxide and 2-hydroxy-2-methyl-1-phenyl-propan-1-one;
benzophenone;
1-propanone, 2-methyl-1-1-(4-(methylthio)phenyl]2-(4-morpholinyl); and
mixtures of these.

Other additives which can be used in the coating composition include, but are not limited to, catalysts, lubricants, wetting agents, antioxidants and stabilizers. The selection and use of such additives is within the skill of the art.

Single coatings can also be used. Exemplary single coatings are disclosed in, for example, U.S. Pat. No. 4,932,750, which is hereby incorporated by reference. Single coatings, like inner primary coatings, generally comprise oligomer, reactive diluent, and optional photoinitiator and additives. Conventional outer primary coatings can be used in the practice of this invention as disclosed in, for example, U.S. Pat. No. 4,472,019, which is hereby incorporated by reference.

The ink base and ink compositions of the present invention can include an adhesion promoter, such as disclosed, for example, in U.S. Pat. No. 5,812,725.

The colorant for the ink composition of the present invention can be any pigment or dye that is suitable for making radiation-curable ink compositions. The use of the term "pigment" refers to both inorganic and organic pigments. Preferably, pigment is utilized in the form of a pigment dispersion in order to simplify dispersion of the pigment within the ink coating composition. The pigment dispersion usually comprises one or more pigments dispersed in a low viscosity liquid, such as a reactive diluent, in such an amount that the pigment dispersion is easily pourable under ambient temperatures. For example, amounts of about 1 to about 80% by weight pigment dispersed in a reactive diluent have been found to be suitable. Pigment dispersions are well known and therefore one skilled in the art will be able to utilize well known pigment dispersions to formulate improved ink compositions according to the present invention based on the disclosure provided herein.

Ribbon assemblies utilizing 12 or less coated optical glass fibers require only 12 colors to adequately distinguish each of the coated optical fibers from one another. However, in larger ribbon assemblies, more than 12 colors may be utilized to adequately distinguish the coated optical glass fibers from one another. Examples of twelve colors normally used for making ribbon assemblies include: black, white, yellow, blue, red, green, orange, brown, pink, aqua, violet and gray.

A specific example of a suitable black pigment includes carbon black.

A specific example of a suitable white pigment includes titanium dioxide.

Specific examples of suitable yellow pigments include diarylide yellow and diazo based pigments.

Specific examples of suitable blue pigments include phthalocyanine blue, basic dye pigments, and phthalocyanines.

Specific examples of suitable red pigments include anthraquinone (red), naptholy red, monoazo based pigments, quinacridone pigments, and perylenes.

Specific examples of suitable green pigments include phthalocyanine green and nitroso based pigments.

Specific examples of suitable orange pigments include monoazo and diazo based pigments, quinacridone pigments, anthraquinones and perylenes.

Specific examples of suitable violet pigments include quinacridone violet, basic dye pigments and carbazole dioxazine based pigments.

Suitable aqua, brown, gray, and pink pigments can easily be formulated by combining other colors. One skilled in the art is able to from any color as desired by combining different coloring agents.

The pigment can be present in the ink composition in an amount that provides coloration that is visible without magnification to facilitate identification of the individual colored optical glass fiber. The amount of the pigment should not be so great as to significantly reduce the cure speed of the ink composition or result in other undesirable affects. Examples of suitable amounts of pigment have been found to be from about 1 to about 20 wt. %, preferably about 1 to about 15 wt. %, more preferably about 1 to about 10 wt. %, based on the total weight of the ink composition.

Preferably, the ink composition contains at least one photoinitiator in an amount of from about 1 to about 20% by weight, more preferably from about 1 to about 10% by weight, based on the total weight of the ink composition.

The ink coating composition can be applied to the coated optical glass and cured using any suitable method. An example of a suitable method is disclosed in U.S. Pat. No. 4,629,285, the complete disclosure of which is incorporated herein by reference. The ink composition can also be applied in a manner similar to the application of the outer primary coating on an optical glass fiber drawing and coating tower.

Ink coatings are usually about 3 to about 10 microns thick and are usually concentric to prevent attenuation of the signal transmission. However, if desired, the ink coating can be applied in any form suitable to provide visible color identification of the individual coated optical glass fibers. Examples of suitable coatings include dashes, dots, lines, and rings. Preferably, the ink coating is substantially concentric. The ink coating compositions according to the present invention are capable of providing substantially concentric ink coatings, as well as discontinuous coatings such as dashes, dots, lines, and rings.

Ribbon assemblies are now well known in the art and the disclosure provided herein will enable one skilled in the art to prepare a novel ribbon assembly containing at least one of the improved coated optical fibers of the present invention for the desired application. The novel ribbon assembly made according to this invention can be used in telecommunication systems. Such telecommunication systems typically include ribbon assemblies containing optical fibers, transmitters, receivers, and switches. The ribbon assembly containing the coated optical fiber of the present invention is the fundamental connecting unit of telecommunication systems. The ribbon assembly can be buried underground or can be laid under water for long distance connections, such as between cities. The ribbon assembly can also be used to connect directly to residential homes.

The novel ribbon assembly made according to this invention can also be used in cable television systems. Such cable television systems typically include ribbon assemblies containing optical fibers, transmitters, receivers and switches. The ribbon assembly containing the coated optical fibers of the present invention is the fundamental connecting unit of such cable television systems, and, like telecommunication systems, can be buried under ground or laid under water for long distance connections, or can be used to connect directly to residential homes.

The invention will be further understood in light of the following Examples which are illustrative of, but not in limitation of, the present invention.

In the Examples, the following abbreviations and names are identified chemically as follows:

| | |
|---|---|
| Oligomer A: | a bisphenol A epoxy acrylate oligomer |
| Oligomer B: | an aliphatic urethane acrylate oligomer |
| Oligomer C: | an aliphatic urethane acrylate oligomer |
| PETTA: | pentaerythritol tetraacrylate |
| TMPTA: | trimethylolpropane triacrylate |
| HDDA: | 1,6-hexanediol diacrylate |
| IBOA: | isobornylacrylate |
| IPDI: | isophorone diisocyanate |
| TMDI: | trimethylhexamethylene diisocyanate |
| DESW: | bis 4,4'-(isocyanatocyclohexyl)methane |
| BHT: | inhibitor |
| Additive A: | secondary amino $\alpha,\omega$-aminoorganofunctional polydimethylsiloxane of Formula II, wherein $n \cong 10$ |
| Additive B: | secondary amino $\alpha,\omega$-aminoorganofunctional polydimethylsiloxane of Formula II, wherein $n \cong 30$ |

-continued

| | |
|---|---|
| Additive C: | hydroxy functional polydimethylsiloxane copolymer, having a number average molecular weight of 950 ± 80 |
| Additive D: | hydroxy functional polydimethylsiloxane copolymer, having a number average molecular weight of 2500 ± 250 |
| Additive E: | an acrylate terminated polydimethylsiloxane copolymer, having a number average molecular weight of 1100 ± 100 |
| Photoinitiator A: | phenyl bis(2,4,6-trimethyl benzoyl) phosphene oxide |
| Photoinitiator B: | 2-methyl-1-[4-(methylthio)phenyl]-2-morpholine propan-1-one |
| Photoinitiator C: | 2-hydroxy-2-methyl-1-phenylpropan-1-one |
| Photoinitiator D: | acrylated benzophenone |
| White Colorant: | TMPTA pigment dispersion |
| Yellow Colorant: | TMPTA pigment dispersion |
| Red Colorant: | TMPTA pigment dispersion |
| Blue Colorant: | TMPTA pigment dispersion |
| Stabilizer A: | proprietary stabilizing surfactant from BYK Chemie |

Optical fiber coated with the ink compositions described in the Examples below were prepared by standard techniques. Ink compositions applied to fiber were cured on the fiber at 600 m/m. Fiber was then coated with matrix resin applied to the coated optical fiber and cured at 260 m/m.

The release characteristics of the fiber optic of compositions made with secondary or tertiary amino silicone-containing release agents in the Examples herein were determined according to the following procedure:

Ribbon Breakout

Ribbon breakout is determined using an approximately one meter strand of four-fiber ribbon. The ribbon strand is grasped between the thumb and forefinger of one hand with approximately ½–1 cm of the ribbon extended above the grip. A fingernail of the other hand is dragged or scraped over the broken or exposed edge of the ribbon. Breakout is considered to be good if, after a few passes of the fingernail over the ribbon, the matrix material is easily fragmented, and the matrix material flakes off the fibers on the extended portion. If the matrix material does not fragment easily and must be twisted or broken by more severe means, then the "breakout" is considered poor.

Mid-Span Access

A 75 micron thick drawdown of a radiation-curable outer primary coating composition was applied to a Mylar sheet and cured by exposure to 1 Joule/cm$^2$ of UV light from a Fusion D lamp under a nitrogen atmosphere to form a cured outer primary film. A 5 to 10 micron thick drawdown of the sample radiation-curable ink composition was formed on the cured outer primary film. The ink-composition was cured by exposure to 1 Joule/cm$^2$ of UV light from a Fusion D lamp in air to form a cured ink coating. A 75 micron thick drawdown of a radiation-curable matrix composition was formed on the ink coating. The matrix composition was cured by exposure to 1 Joule/cm$^2$ of UV light from a Fusion D lamp under a nitrogen atmosphere to form a cured matrix material on the ink coating.

Strips of the formed multilayer film were cut having a width of from about ¼ to about ½ inch. At one end of each strip, a portion of the matrix material was separated from the ink coating using a knife. Force was applied to the separated portion of the matrix material to attempt to peel the remaining matrix material from the ink coating. If the remaining matrix material separated cleanly from the ink coating, wherein the ink coating remained intact and the matrix material did not break apart, the ink coating passed the mid-span access test.

EXAMPLES 1–5

These Examples illustrate an ink base composition and ink compositions which include a secondary amino silicone-containing release additive in accordance with the invention. The additive is a secondary amino polydimethylsiloxane identified as Additive A. The ink base compositions and ink compositions are set forth in Table I below.

TABLE I

| | Ex.1 Clear Ink Base | Ex.2 White | Ex.3 Red | Ex.4 Yellow | Ex.5 Blue |
|---|---|---|---|---|---|
| Oligomer A | 30.45 | 26.00 | 23.52 | 24.35 | 26.58 |
| PETTA | 15.26 | 13.03 | 11.79 | 12.20 | 13.32 |
| TMPTA | 9.10 | 7.77 | 7.03 | 7.28 | 7.94 |
| HDDA | 7.13 | 6.09 | 5.51 | 5.70 | 6.22 |
| IBOA | 7.03 | 6.00 | 5.43 | 5.62 | 6.14 |
| Oligomer B | 20.00 | 17.07 | 15.45 | 16.00 | 17.46 |
| BHT | 0.57 | 0.49 | 0.44 | 0.46 | 0.50 |
| Additive A | 3.88 | 3.31 | 3.00 | 3.10 | 3.39 |
| Photoinitiator A | 2.00 | 1.71 | 1.55 | 1.60 | 1.75 |
| Photoinitiator C | 4.58 | 3.91 | 3.54 | 3.66 | 4.00 |
| Colorant: Wht | 0.0 | 14.38 | 2.38 | 10.56 | 1.00 |
| Colorant: Ylo | 0.0 | 0.00 | 0.00 | 9.21 | 0.00 |
| Colorant: Red | 0.0 | 0.00 | 16.01 | 0.00 | 0.00 |
| Colorant: Blu | 0.0 | 0.00 | 0.00 | 0.00 | 11.45 |
| Stabilizer A | 0.25 | 0.25 | 0.25 | 0.25 | 0.25 |
| Total | 100.00 | 100.00 | 100.00 | 100.00 | 100.00 |

Each of the compositions of Examples 1–5 was tested for its release characteristics according to the breakout and mid-span access tests described above. All of the compositions exhibited very good release properties. The matrix material was easily removed from the fibers, residual matrix material did not adhere to the fibers and the matrix material did not remove the ink coating from the fibers.

EXAMPLES 6–7

These Examples illustrate ink compositions made in accordance with the present invention in which the silicone-containing release agent is Additive B. The compositions and the mid-span access test results are set forth in Table II, below:

TABLE II

| Component | Ex. 6 | Ex. 7 |
|---|---|---|
| Oligomer A | 31.35 | 32.31 |
| HDDA | 21.83 | 22.48 |
| Oligomer C | 20.90 | 21.54 |
| Additive B | 2.20 | 2.27 |
| BHT | 0.48 | 0.50 |
| Photoinitiator A | 1.37 | 1.41 |
| Photoinitiator B | 2.75 | 2.83 |
| Photoinitiator C | 3.85 | 3.96 |
| Colorant: White | 15.02 | 1.00 |
| Colorant: Blue | 0.0 | 11.45 |
| Stabilizer A | 0.25 | 0.25 |
| Total | 100.00 | 100.00 |
| Mid-Span Access | Pass | Pass |

EXAMPLES 8–21

These Examples illustrate the synthesis of tertiary-amino polydimethylsiloxane release agents for use in an ink base and in ink compositions. These release agents were prepared using the same process as described above. The chemicals used to prepare the tertiary amino silicone-containing release agents are set forth in Table III below:

TABLE III

| Component | Ex.8 | Ex.9 | Ex.10 | Ex.11 | Ex.12 | Ex.13 | Ex.14 | Ex.15 | Ex.16 | Ex.17 | Ex.18 | Ex.19 | Ex.20 | Ex.21 |
|---|---|---|---|---|---|---|---|---|---|---|---|---|---|---|
| Dimethyl ethanol amine | 5.72 | 16.58 | | | | 5.75 | | | | | | 11.61 | 10.89 | 11.45 |
| Diethanol amine | | | 12.14 | | | | | | | | | | | |
| 1-Ethyl-3-hydroxy piperidine | | | | 16.27 | | | | | | | 8.28 | | | |
| Hydroxyethyl morpholine | | | | | 8.24 | | 16.33 | 8.24 | | | | | | |
| Dimethyl propanol amine | | | | | | | | | 8.64 | 16.91 | | | | |
| IPDI | 14.24 | | | | | | | | | | | | | 28.5 |
| TMDI | | | | 26.05 | 13.26 | 13.62 | 26.03 | 13.26 | 13.2 | 25.85 | 13.25 | 27.46 | | |
| DESW | | | | | | | | | | | | | 31.99 | |
| Additive D | 80.04 | | | | 78.5 | 80.63 | | 78.5 | 78.16 | | 78.47 | | | |
| Additive C | | | | 57.68 | | | 57.64 | | | 57.24 | | 60.93 | 57.12 | 60.05 |
| Additive E | | 83.42 | 87.86 | | | | | | | | | | | |
| Total | 100 | 100 | 100 | 100 | 100 | 100 | 100 | 100 | 100 | 100 | 100 | 100 | 100 | 100 |

EXAMPLES 22–31

The tertiary amino polydimethylsiloxane release agents prepared in Examples 10, 19 and 21 were added to inks as shown in Table IV. Examples 22–27 were tested for mid-span access, as described above. For comparison, aminohydrocarbons were also tested, as shown in Examples 28 through 31.

showed excellent release characteristics. Inks with only aminohydrocarbons, Examples 28–31, showed no release characteristics.

While this invention has been described with emphasis on preferred embodiments, it will be apparent to those of ordinary skill in the art that the invention is not so limited, and that the preferred embodiments can be varied. It is intended that the invention can be practiced otherwise than as specifically described herein. Accordingly, this invention includes all modifications encompassed within the spirit and scope of the appended claims.

What is claimed is:

1. A radiation-curable fiber optic ink base composition comprising, in the uncured state, at least one monomer or oligomer having a radiation-curable functional group, a photoinitiator for said monomer or oligomer present in an

TABLE IV

| Component | Ex.22 | Ex.23 | Ex.24 | Ex.25 | Ex.26 | Ex.27 | Ex.28 | Ex.29 | Ex.30 | Ex.31 |
|---|---|---|---|---|---|---|---|---|---|---|
| Oligomer A | 30.32 | 31.24 | 30.32 | 31.24 | 30.32 | 31.24 | 30.32 | 31.24 | 30.32 | 31.24 |
| HDDA | 18.29 | 18.84 | 18.29 | 18.84 | 18.29 | 18.84 | 18.29 | 18.84 | 18.29 | 18.84 |
| Oligomer C | 15.82 | 16.30 | 15.82 | 16.30 | 15.82 | 16.30 | 15.82 | 16.30 | 15.82 | 16.30 |
| Ex. 10 tert-amino | 4.41 | 4.54 | | | | | | | | |
| Ex. 19 tert-amino | | | 4.41 | 4.54 | | | | | | |
| Ex. 21 tert-amino | | | | | 4.41 | 4.54 | | | | |
| Cocamide DEA | | | | | | | 4.41 | 4.54 | | |
| Cocamidopropyl DMA | | | | | | | | | 4.41 | 4.54 |
| BHT | 0.48 | 0.50 | 0.48 | 0.50 | 0.48 | 0.50 | 0.48 | 0.50 | 0.48 | 0.50 |
| Photoinitiator A | 0.96 | 0.99 | 0.96 | 0.99 | 0.96 | 0.99 | 0.96 | 0.99 | 0.96 | 0.99 |
| Photoinitiator B | 3.86 | 3.97 | 3.86 | 3.97 | 3.86 | 3.97 | 3.86 | 3.97 | 3.86 | 3.97 |
| Photoinitiator C | 2.89 | 2.98 | 2.89 | 2.98 | 2.89 | 2.98 | 2.89 | 2.98 | 2.89 | 2.98 |
| Photoinitiator D | 7.70 | 7.94 | 7.70 | 7.94 | 7.70 | 7.94 | 7.70 | 7.94 | 7.70 | 7.94 |
| Colorant: White | 15.02 | 1.00 | 15.02 | 1.00 | 15.02 | 1.00 | 15.02 | 1.00 | 15.02 | 1.00 |
| Colorant: Blue | | 11.45 | | 11.45 | | 11.45 | | 11.45 | | 11.45 |
| Stabilizer A | 0.25 | 0.25 | 0.25 | 0.25 | 0.25 | 0.25 | 0.25 | 0.25 | 0.25 | 0.25 |
| Total | 100.00 | 100.00 | 100.00 | 100.00 | 100.00 | 100.00 | 100.00 | 100.00 | 100.00 | 100.00 |
| Mid-Span Access | Pass | pass | pass | pass | Pass | pass | fail | fail | fail | fail |

Each of the inks which included the tertiary amino polydimethylsiloxane release agents, Examples 22–27 amount sufficient to effect radiation cure of said monomer or oligomer, and a silicone-containing additive comprising the reaction product of a secondary amino-functional poly(di-substituted siloxane) and an ethylenically unsaturated compound, wherein said siloxane backbone is only substituted with at least one aliphatic hydrocarbon, at least one aromatic hydrocarbon or a combination of aliphatic and aromatic hydrocarbons, and wherein said ethylenically unsaturated compound includes only one double bond, such that the reaction product of said secondary amino-functional poly (di-substituted siloxane) and said ethylenically unsaturated compound is substantially free of ethylenic unsaturation.

2. The radiation-curable fiber optic ink base composition of claim 1, wherein said ethylenically unsaturated compound is selected from the group consisting of an acrylate or methacrylate.

3. The radiation-curable fiber optic ink base composition of claim 2 wherein said secondary amino-functional poly (di-substituted siloxane) is a secondary amino-functional poly(di-methylsiloxane).

4. A radiation-curable fiber optic ink base composition comprising, in the uncured state, at least one monomer or oligomer having a radiation-curable functional group, a photoinitiator for said monomer or oligomer present in an amount sufficient to effect radiation cure of said monomer or oligomer, and a silicone-containing additive comprising the reaction product of a secondary amino-functional poly(di-substituted siloxane) and an ethylenically unsaturated compound, wherein the siloxane backbone of said silicone-containing additive has the structure:

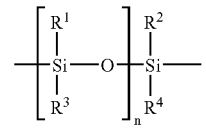

wherein each of $R^1$, $R^2$, $R^3$ and $R^4$ can be the same or different and is an aliphatic hydrocarbon or an aromatic hydrocarbon selected from the group consisting of phenyl or substituted phenyl, wherein said ethylenically unsaturated compound includes only one double bond, such that the reaction product of said secondary amino-functional poly(di-substituted siloxane) and said ethylenically unsaturated compound is substantially free of ethylenic unsaturation.

5. The radiation-curable fiber optic ink base composition of claim 4, wherein said ethylenically unsaturated compound is selected from the group consisting of an acrylate or methacrylate.

6. The radiation-curable fiber optic ink base composition of claim 4, wherein said secondary amino-functional poly (di-substituted siloxane) is a secondary amino-functional poly(di-methylsiloxane).

7. The radiation-curable fiber optic ink base composition of claim 4, wherein said siloxane is substituted with a combination of aliphatic and aromatic hydrocarbons.

* * * * *